2,759,981

SULPHUR DIOXIDE CHLORINATION OF PHENOL

Blaine O. Pray, Wadsworth, and Donald N. Sukow, Barberton, Ohio, assignors, by mesne assignments, to Columbia-Southern Chemical Corporation, Pittsburgh, Pa., a corporation of Delaware No Drawing. Application June 24, 1950,
Serial No. 170,260

7 Claims. (Cl. 260—623)

This invention relates to a method of producing dichlorophenol and more particularly to a method of producing 2,4-dichlorophenol.

The specific dichlorophenol, namely, 2,4-dichlorophenol, is useful in industry, for example, in production of 2,4-dichlorophenoxyacetic acid. A known procedure for producing 2,4-dichlorophenol involves the chlorination of phenol with gaseous chlorine in a single step operation without a catalyst at temperatures of the order of 45 to 100° C. Under these conditions, the phenol first chlorinates to a mixture of para- and ortho-monochlorophenols in a ratio of about 1.5 to 1, which are then further chlorinated to a mixture containing about 82 percent 2,4-dichlorophenol, 8 percent 2,6-dichlorophenol and 10 percent 2,4,6-trichlorophenol. The 2,6-dichlorophenol arises from chlorination of a portion of the orthochlorophenol. The mixture of the 2,4-dichlorophenol and 2,6-dichlorophenol is extremely difficult to separate due to the proximity of their boiling points. The presence of the 2,6-dichlorophenol with the desired 2,4-dichlorophenol is objectionable for commercial use, such as in the making of 2,4-dichlorophenoxyacetic acid or esters thereof.

A two-stage chlorination of phenol has also been used. This involves the introduction of enough chlorine to convert the phenol to a mixture of ortho- and para-monochlorophenols, with interruption of chlorination before much of the monochlorophenol mixture is converted to dichlorophenol, and separation of the more volatile orthochlorophenol by distillation. With the orthochlorophenol removed from the mixture, the source of 2,6-dichlorophenol is eliminated since parachlorophenol chlorinates to give only the desired 2,4-dichlorophenol. This two-stage procedure possesses the disadvantage, however, that the byproduct, orthochlorophenol, is a waste material, and also the two step procedure is somewhat more costly than the single step procedure. Also, this separation requires some fractionation and hence a relatively expensive fractionating column.

In accordance with the present invention, a method of reacting chlorine with phenol or 2-chlorophenol has been discovered in which 2,4-dichlorophenol is produced with low yields of 2,6-dichlorophenol and even to the substantial exclusion of 2,6-dichlorophenol. This method comprises the reaction of chlorine with phenol in liquid phase and in the presence of an appreciable amount of sulphur dioxide. For example the process may be successfully performed by chlorinating a liquid mixture of phenol and liquid sulphur dioxide. The chlorination of a liquid mixture of phenol and liquid sulphur dioxide as a solvent proceeds rapidly at the refluxing temperature of sulphur dioxide solutions of phenol with very little, if any, formation of the 2,6-dichlorophenol. The ratio of parachlorophenol to orthochlorophenol at the monochlorophenol stage is about 3 to 1. Notwithstanding this appreciable concentration of orthochlorophenol, the one-stage chlorination of phenol in sulphur dioxide to dichlorophenol has been found capable of giving a 2,4-dichlorophenol of considerably higher yield and greater purity than is possible from the single stage chlorination of phenol now known in the art.

Sulphur dioxide has been found to have a specific action which favors production of the desired isomer for reasons which are not now known or understood. This effect takes place during the chlorination of the orthochlorophenol to minimize formation of 2,6-dichlorophenol from orthochlorophenol as well as in the chlorination of phenol to monochlorophenol thus minimizing formation of orthochlorophenol. It has been determined that the chlorination of orthochlorophenol in sulphur dioxide gives a dichlorophenol mixture containing more 2,4-dichlorophenol than if orthochlorophenol is chlorinated, for example, at 45° C., using gaseous chlorine without a catalyst in the manner set forth above.

It has been found that there is very little tendency for the sulphur dioxide employed to chlorinate during the reaction until after 2 atoms of chlorine per mole of phenol have been substituted in the phenol. Thus no competition arises in the reaction for chlorine between the phenol and the sulphur dioxide. However, after the dichlorophenol has been produced, some sulphur dioxide tends to chlorinate to sulfuryl chloride and thus compete for chlorine with the dichlorophenol which has been produced. This shows a further advantage achieved by the present invention in that if too much chlorine is used the sulphur dioxide will begin to take it up rather than the phenol which would further chlorinate to undesired trichlorophenol.

The amount of sulphur dioxide present should be substantial as distinguished from catalytic amounts. When no other solvent is used, sufficient sulphur dioxide should be present to maintain the reaction mixture in liquid state during the chlorination. This amount is dependent upon the pressure upon the system.

At atmospheric pressure it is convenient to use liquid sulphur dioxide in the proportion of at least about 400 grams of sulphur dioxide per mole of phenol or chlorophenol, permitting the sulphur dioxide to reflux during the reaction. At superatmospheric pressures where the reaction mixture can be maintained in liquid state at higher temperatures, less sulphur dioxide, for example 200 grams or above per mole of phenol or monochlorophenol is required to keep the mixture liquid.

When inert solvents are used even less sulphur dioxide is permissible but for most purposes, the amount of sulphur dioxide used should be at least about one mole per mole of phenol or monochlorophenol. Typical solvents which are suitable include chloroform, carbon tetrachloride, dichloro difluoromethane and ethylene dichloride.

The temperature of the reaction should be sufficiently low to permit establishment of the sulphur dioxide at the desired concentration. At atmospheric pressure it is advantageous to conduct the reaction at a temperature which may be conveniently maintained by reflux of sulphur dioxide from the reaction mixture. Such temperatures approximate or are 5 to 25° C. above the boiling point of liquid sulphur dioxide. Higher temperatures are permissible for example at superatmospheric pressures.

The reaction normally is carried out by mixing liquid sulphur dioxide with phenol and passing gaseous chlorine through the reaction mixture at a temperature sufficient to cause refluxing of the liquid sulphur dioxide-phenol mixture at atmospheric pressure. As has already been stated, higher temperatures are permissible providing the pressure is sufficient to maintain a considerable amount of the sulphur dioxide in liquid form in the mixture. It has been found that most desirable results are achieved when from about 1.99 to 2.2 moles of chlorine are passed through the reaction mixture per mole of phenol present.

Somewhat lower amounts of chlorine are permissible if incomplete chlorination is not objectionable. The amount of sulphur dioxide with which best results in this instance are achieved is about 400 to 600 grams per mole of phenol present. This chlorine addition is generally carried out over a period of 1 to 10 hours, depending somewhat upon the condenser capacity employed. After the chlorine addition, the reaction mixture is refluxed for several hours and then the sulphur dioxide is distilled off leaving the crude product. The 2,4-dichlorophenol is separated from this crude product by fractional distillation.

In accordance with a further embodiment of the invention, orthochlorophenol which has been produced by any one of a number of conventional methods, may be chlorinated in the presence of liquid sulphur dioxide to produce high yields, above 90 percent by weight, of 2,4-dichlorophenol and relatively low yields, less than 10 percent by weight of 2,6-dichlorophenol.

The following examples illustrate several methods of carrying out the invention:

Example I

A three-necked 3,000 cubic centimeter glass flask fitted with a motor driven glass agitator, a chlorine inlet and a Dry Ice-acetone condenser was employed. Three moles (282 grams) of phenol were dissolved in 1,206 grams of liquid sulphur dioxide and this mixture was heated to a temperature sufficient to cause gentle refluxing. Then 6.6 moles (486.6 grams) of cold gaseous chlorine were passed into the mixture near the bottom of the reactor and allowed to react with the phenol. The chlorine was stored as liquid chlorine in a flask surrounded with powdered Dry Ice and the temperature was regulated so as to pass off gaseous chlorine at a constant rate over a period of about 10 hours. The chlorine addition cannot be too fast at first or a violent evolution of gas will occur. The mixture was thoroughly agitated during the chlorine addition. After the chlorine addition, the reaction mixture was allowed to reflux for 2 hours.

At the end of 2 hours, the refluxing was discontinued and sufficient heat was applied to the mixture to remove the liquid sulphur dioxide. This heating was carried on for approximately 2 hours. A solid formed in the reaction mixture after a large portion of the sulphur dioxide was removed and it was necessary, due to the poor heat transfer of the solid, to increase the temperature to about 80° C. Further degassing at 80° C. and 100 millimeters pressure was then carried on for approximately 30 minutes.

The crude product remaining was then distilled through a distillation column having approximately 35 plates to obtain the final product, 2,4-dichlorophenol. The dichlorophenl thus produced contained about 98 percent by weight 2,4-dichlorophenol.

Example II

The same apparatus was employed as described in Example I. Two moles (257.1 grams) of orthochlorophenol were dissolved in 640 grams of liquid sulphur dioxide and the solution was heated to a temperature sufficient to cause gentle refluxing. Then 2.2 moles (156.2 grams) of cold gaseous chlorine were passed into the mixture at a uniform rate for approximately 1.5 hours, while the mixture was being thoroughly agitated. The refluxing and agitation was continued for about two hours after the termination of the chlorine addition. The liquid sulphur dioxide was then removed from the reaction mixture by distillation for approximately two hours. A solid formed in the reaction mixture after a large portion of the sulphur dioxide was removed and it was necessary, due to poor heat transfer of the solid, to increase the temperature to about 80° C. Further degassing at 80° C. and 100 millimeters pressure was then carried on for about 30 minutes.

The crude product remaining was then distilled through a distillation column having approximately 35 plates to obtain the final product, which contained less than 10 percent by weight of 2,6-dichlorophenol and more than 90 percent by weight of 2,4-dichlorophenol. When orthochlorophenol is chlorinated directly without the use of liquid sulphur dioxide, the product contains 20 or more percent by weight of 2,6-dichlorophenol.

Although the present invention has been described with reference to specific details of certain embodiments thereof, it is not intended that such details shall be regarded as limitations upon the scope of the invention except insofar as included in the accompanying claims.

We claim:
1. A method of producing 2,4-dichlorophenol to the substantial exclusion of 2,6-dichlorophenol which comprises chlorinating with elemental chlorine a liquid mixture of a phenol and sulphur dioxide, said mixture containing sufficient sulphur dioxide to maintain the reaction mixture in liquid state during chlorination.
2. A method of producng 2,4-dichlorophenol which comprises dissolving phenol in liquid sulphur dioxide and reacting such solution with a sufficient amount of elemental chlorine to form essentially 2,4-dichlorophenol.
3. A method of producing 2,4-dichlorophenol which comprises chlorinating with elemental chlorine a liquid mixture of orthomonochlorophenol and sulphur dioxide, said mixture containing sufficient sulphur dioxide to maintain the reaction mixture in liquid state during chlorination.
4. A method of producing 2,4-dichlorophenol which comprises chlorinating with elemental chlorine phenol to monochlorophenol and chlorinating with elemental chlorine the monochlorophenol to dichlorophenol in a liquid mixture of the monochlorophenol and sulphur dioxide containing sufficient sulphur dioxide to maintain the reaction mixture in liquid state during said chlorination to dichlorophenol.
5. A method of producing 2,4-dichlorophenol which comprises chlorinating with elemental chlorine a liquid mixture of orthomonochlorophenol and liquid sulphur dioxide, said mixture containing at least one mole of sulphur dioxide per mole of orthomonochlorophenol.
6. A method of producing 2,4-dichlorophenol which comprises chlorinating with elemental chlorine a liquid mixture of phenol and liquid sulphur dioxide, said mixture containing sufficient sulphur dioxide to maintain the reaction mixture in liquid state during chlorination.
7. A method of producing 2,4-dichlorophenol which comprises chlorinating with elemental chlorine a liquid mixture of phenol and liquid sulphur dioxide, said mixture containing at least one mole of sulphur dioxide per mole of phenol.

References Cited in the file of this patent
UNITED STATES PATENTS

| | | |
|---|---|---|
| 1,847,566 | Laschinger | Mar. 1, 1932 |
| 2,440,602 | Foster et al. | Apr. 27, 1948 |
| 2,452,154 | Ross | Oct. 26, 1948 |